March 4, 1969   H. E. BONIFACE   3,430,447
EAVESTROUGH CONNECTOR
Filed Dec. 6, 1966

INVENTOR.
HARRY E. BONIFACE
BY Church & Rogers

United States Patent Office 3,430,447
Patented Mar. 4, 1969

3,430,447
EAVESTROUGH CONNECTOR
Harry Edgar Boniface, 80 London St. N., Hamilton, Ontario, Canada
Filed Dec. 6, 1966, Ser. No. 607,344
Claims priority, application Canada, Dec. 9, 1965, 947,364
U.S. Cl. 61—15                      7 Claims
Int. Cl. E02b 9/04

ABSTRACT OF THE DISCLOSURE

This invention pertains to a connector for securing the ends of abutting eavestrough sections together, the connector comprising inner and outer members which are hingedly joined together and embrace the end of each eavestrough section; a deformable flange on the inner member is forced into an open bead on the outer member to clamp the connector to the eavestrough section.

---

This invention relates to an eavestrough connector.

In the past, tinsmiths employed on eavestroughing would generally speaking join lengths of eavestrough together by means of soldering. However, to an increasing extent eavestroughing is now being carried out by home owners themselves and in such cases, the home owners frequently do not have the necessary skill or equipment available for soldering eavestrough. Accordingly, a considerable market has arisen for the sale of eavestrough connectors, which has generally speaking in the past been satisfied by a connector comprising an exterior sheath or shoe portion fitting around the adjacent butt ends of the two lengths of eavestrough and having a pair of spring steel tongues under which the adjacent butt ends of the two lengths of eavestrough were interengaged. This form of connector was extremely awkward to use since, due to the variations in the shape of the eavestrough, caused for example, by wracking, the butt ends of the lengths of eavestrough were extremely difficult to slip under the spring steel tongue members. Various different forms of connectors have been proposed to overcome this problem relying on, for example, bolts or threaded devices of various kinds for clamping eavestrough but all of these devices have suffered from the defect that they were liable to develop leaks through the bolt holes and, in addition, were highly expensive to manufacture and were time consuming to assemble.

Accordingly, it is an objective of the invention to provide a connector for butt ends of lengths of eavestrough which may readily be assembled around the adjacent butt ends of eavestrough with a minimum of operation, and which may be manufactured and sold at an economical price.

More particularly, it is an objective of the present invention to provide an eavestrough connector having the foregoing advantages which may be assembled together with the lengths of eavestrough in an open condition and which may be subsequently spring-clipped into its closed or gripping position.

More particularly, it is an objective of the present invention to provide an eavestrough connector having the foregoing advantages which may be assembled without the use of bolts or any special tools.

The foregoing and other objectives will become apparent from the following description of a preferred embodiment of the invention which is here given by way of example only and with reference to the following drawings which like reference devices refer to like parts thereof throughout the various views and diagrams, and in which.

Figure 1:
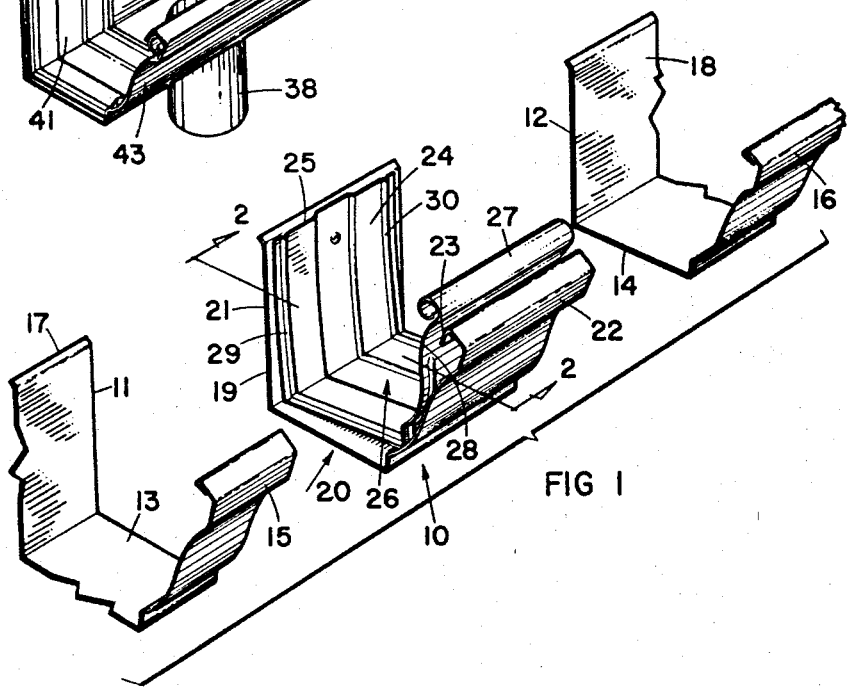
FIGURE 1 is a perspective view of a connector according to the present invention and shows the connector in the open position ready to receive the butt ends of two lengths of conventional eavestroughing.

With reference to FIGURE 1 an eavestrough connector according to the present invention is illustrated and indicated generally as 10. In the drawing a pair of butt ends 11 and 12 are shown in alignment with the connector 10, the butt ends 11 and 12 being formed in the shape of the conventional eavestrough as is normally provided in Canada. Each eavestrough section is provided with the trough portion as at 13 and 14 and an open bead 15 and 16 formed along the outer edge thereof. The inner edge as at 17 and 18 is the edge which is normally secured to the building, this being done in a conventional way.

The connector 10 comprises an outer member 19 having a trough portion as at 20 and an inner edge 21. The outer edge of outer member 19 is provided with the flange 22, this flange being open and having a downwardly depending lip as at 23. It will be seen from the drawing that the open flange 22 is similar in configuration to the open bead 15 and 16 on the eavestrough sections 11 and 13. This is to provide a smooth exterior appearance upon the connector being installed and it is anticipated by the present invention to provide the open flange and indeed the trough portion of the outer member of a configuration adapted to follow the configuration of the conventional eavestrough.

Figure 2:
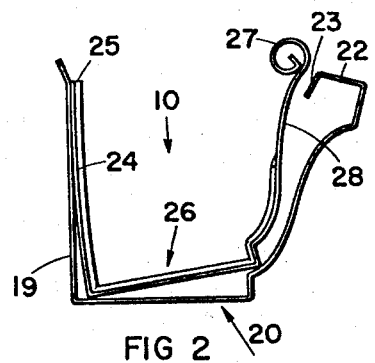
FIGURE 2 is a section along the line 2—2 of FIGURE 1.

An inner member 24 is secured along the edge 25 to the inner edge 21 of outer member 20 and extends into a trough-like portion as at 26 similar to the configuration of outer outer member 20. In one preferred embodiment outer member 26 is secured to the inner member 24 by means of soldering. Other means for securing the outer and inner members together can be resorted to such as for instance, by providing an interlocking tongue and slot or alternatively, providing a hinge at this position. In any event, the joining means should allow for some movement in order that the connector can be spread as shown in FIGURE 2. A heel portion 28 is provided on the rolled flange 27 to fit within the open flange 22, whereby upon inner member 24 being assembled within the trough 11 and 12 and upon the outer member 19 being assembled thereabout, the rolled flange 27 can be compressed within the open flange 22 thereby to form a lock and secure both inner and outer members about the ends of the eavestrough.

Figure 3:
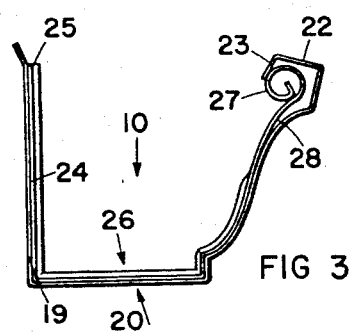
FIGURE 3 is a section similar to that as shown in FIGURE 2 but shows the connector in the installed position about a piece of eavestroughing.

The open position of the inner and outer members is shown in FIGURE 2 and closed position of the connector about a length of eavestrough is shown in FIGURE 3. It will be seen that inner and outer members are formed to conform to the respective inner and outer contours of conventional eavestrough, whereby a substantially tight joint is obtained between two butt ends. While a particular type of eavestrough is illustrated in the drawings, it will be seen that the invention is adaptable for other cross-sectional shapes as well. Thus, for different types of cross-sectional shapes the requirement according to the present invention is to provide an inner and outer member conforming to the shape of the trough, together with an open flange on the outer member cooperating with a rolled flange on the inner member to provide a lock thereby to secure both inner and outer members in close contact with the particular trough shape.

In order to increase the clamping action of the connector 10 a pair of beads 29 and 30 are provided along both edges of the inner member 24 whereby the stiffness of the inner member is increased. In this manner, the inner member 24 has more resistance to any tendency to buckle under the strain imposed by the locking device along the outer edge of the connector. Inasmuch as the outer member 19 is under tensional stresses, additional stiffening means are not required as is the case with the inner member where portions of the trough area are under compressional stresses.

The beads 29 and 30 formed in the inner member also provide spaces for voids between this member and the eavestrough which can be used to provide additional sealing means for the connector. Thus, a suitable sealing compound such as for instance, putty or epoxy resins, can be placed within these voids, whereby a more waterproof joint is obtained. In the case of using epoxy, the strength of the joint can also be increased since such resins bond well to the metal of the eavestrough and thus provide additional strength.

Figure 4:
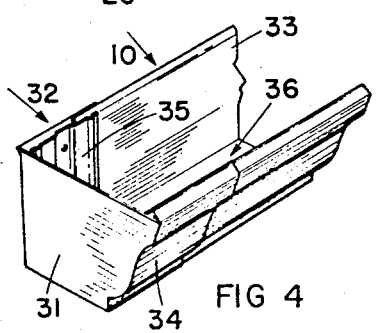

With reference to FIGURE 4 a further embodiment of the invention is illustrated wherein an end plate 31 is provided on one end of the device 32. The device 32 is similar in construction to the connector as shown in FIGURE 1, with the exception that the end plate 31 is secured to the outer member by conventional means, such as for instance by soldering. The device 32 can then be mounted onto the end of a length of eavestrough as at 33 thereby to provide a closed end therefor. It will be understood that the outer member 34 of the device 32 can be extended a length substantially greater than the length of the inner member 35 whereby the device 32 as a whole will constitute that which is normally called an end cap, thereby to provide a butt end on a length of eavestrough terminating at the end of a building. In this connection it should also be noted that the clamp arrangement as at 36 will be effective over a length similar to the length for the connector shown in FIGURE 1, and that the outer member 34 extending to the length as required provides the end portion of an eavestrough run.

Figure 5:
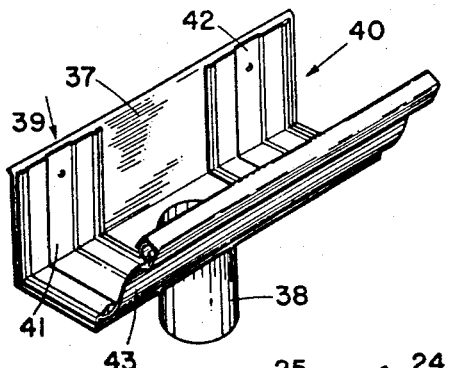
FIGURES 4 and 5 are perspective views of further embodiments according to the present invention.

With reference to FIGURE 5 a still further embodiment of the invention is illustrated whereby a length of eavestrough 37 is provided with the down spout attachment 38. A clamping device similar to the connector as shown in FIGURE 1 is provided at the ends as at 39 and 40 of the trough 37, whereby the trough can be connected between butt ends of two eavestrough sections to provide attachment for the down spout. The inner members 41 and 42 are formed similarly to the member 24 as shown in FIGURE 1. As before, the inner flange as at 43 provides means for the inner members 41 and 42 to clamp butt ends of two sections of eavestrough, as well as providing a continuation of the bead along the exterior edge of the eavestrough.

It will also be seen that corner assemblies can be provided by connecting a pair of connectors such as illustrated in FIGURE 1, whereby adjacent ends of two eavestrough sections can be connected at a corner of a building. The provision of such mitered joints is well within the scope of persons skilled in the art and for this reason details of such arrangement are not shown in the drawings.

From the foregoing it will be seen that the present invention provides an eavestrough connector which is comparatively simple to install on adjoining ends of eavestrough and which provides a secure joint without resort to fastening means such as for instance, screws or rivets. In addition, different ways may be employed for installing the connector onto the eavestrough joint according to the individual preferences of the person which in many cases would be a handyman and not a tradesman, the connector for instance being slipped onto one adjoining end and before lengths of eavestrough are installed or even opened wide to be installed over the eavestrough ends once the both sections were installed onto the building. For short lengths of eavestrough it would also be possible to install the connector completely, thus connecting a short length of trough while the eavestrough was on the ground and before installation onto the building, thus providing the handyman with only one piece of trough to handle.

A further advantage to be gained from the present invention is realized in the simplicity of the parts making up the eavestrough connector. Both inner and outer members of the connector are formed in a configuration quite similar to the configuration of conventional eavestrough and thus may be formed in a similar manner using the same equipment as is used with conventional troughs. This is a great advantage since companies normally supplying the eavestrough could manufacture and supply the connector without the aid of special tooling or changes in production methods. Thus while the simplicity of construction provides a connector which is comparatively inexpensive, the configuration of the members, following the formation of conventional eavestrough, further aids in reducing the overall cost of producing a connector.

What I claim is:

1. An eavestrough connector for attachment to a butt end of a length of eavestrough which has a trough portion and an open bead along one edge thereof, said connector comprising; an outer member which is formed to match generally the outer contour of the said eavestrough; an inner member which is of trough-like configuration to fit within said eavestrough and includes a deformable resilient flange along the edge thereof associated with the said one edge of the outer member; and means hingedly joining said inner member and said outer member together to permit spreading apart of the inner and outer members for the insertion of said eavestrough butt end therebetween, whereby upon said outer member being placed about said eavestrough butt end, said inner member being fitted within said eavestrough butt end, and said deformable flange being forced into said open bead, the said flange cooperates with the open bead to clamp said butt end between said inner and outer members.

2. An eavestrough connector or attachment to a butt end of a length of eavestrough which has a trough portion with a substantially flat inner wall terminating in the inner edge and an open bead along the outer edge, said connector comprising; an outer member which is formed to match generally the outer contour of said eavestrough; an inner member which is of trough-like configuration to fit within said eavestrough and includes a deformable resilient flange along the edge thereof associated with the said one edge of the outer member; and means hingedly joining said inner and outer members together adjacent the inner edges thereof to permit spreading apart of the inner and outer members for the insertion of said eavestrough butt end therebetween, whereby upon said outer member being placed about said eavestrough butt end, said inner member being fitted within said eavestrough butt end, and said deformable flange being forced into said open bead, the said flange cooperates with the open bead to clamp said butt end between said inner and outer members.

3. An eavestrough connector for attachment to a butt end of a length of eavestrough which has a trough portion and an open bead along one edge thereof, said connector comprising; an outer member which is formed to match generally the outer contour of the said eavestrough; an inner member which is of trough-like configuration to fit within said eavestrough and includes a deformable resilient flange along the edge thereof associated with the said one edge of the outer member; and means hingedly joining said inner member and said outer member together substantially centrally of the length of the inner member to permit spreading apart of the inner and outer members for the insertion therebetween from opposite directions of the butt ends of the two eavestrough sections to be connected thereby, whereby upon said outer member being placed about said eavestrough butt ends, said inner members being fitted within said eavestrough butt ends, and said resilient flange being forced into said open bead, the said flange cooperates with the open bead to clamp said butt ends between the inner and outer members.

4. An eavestrough connector as claimed in any one of claims 1, 2 and 3, in which said resilient flange is a rolled flange.

5. An eavestrough connector as claimed in any one of claims 1, 2 and 3, in which stiffening beads are provided adjacent the two laterally-extending sides of said inner member, thereby to increase the clamping action of said connector.

6. An eavestrough connector as claimed in claim 1 or 2, and comprising an end plate attached to and closing one end of the outer member for the connector to constitute an eavestrough end closure cap.

7. An eavestrough connector as claimed in any one of claims 1, 2 and 3, and comprising a common outer member of length greater than two inner members, two inner members each disposed at a respective end of the common outer member and respectively hingedly joined thereto, and a downspout connection secured to the outer member between the said two inner members.

References Cited
UNITED STATES PATENTS

| | | | |
|---|---|---|---|
| 2,639,680 | 5/1953 | Tennison | 61—15 |
| 3,252,289 | 5/1966 | Tennison | 61—15 |
| 3,253,415 | 5/1966 | Davidson | 61—15 |

FOREIGN PATENTS

| | | |
|---|---|---|
| 24,544 | 9/1936 | Australia. |
| 594,864 | 11/1947 | Great Britain. |
| 250,556 | 3/1964 | Australia. |

EARL J. WITMER, *Primary Examiner.*